(12) United States Patent
Aragonés Gaya et al.

(10) Patent No.: US 10,567,676 B2
(45) Date of Patent: Feb. 18, 2020

(54) METHOD, DEVICE AND INSTALLATION FOR COMPOSING A VIDEO SIGNAL

(71) Applicant: COHERENT SYNCHRO, S.L., Barcelona (ES)

(72) Inventors: José María Aragonés Gaya, Barcelona (ES); Sergio Andrés Basurco Mancisidor, Badalona (ES); Manuel Marí Gomez, Barcelona (ES); Martín Matilla Sarrate, Sant Boi de Llobregat (ES)

(73) Assignee: COHERENT SYNCHRO, S.L., Barcelona (ES)

( * ) Notice: Subject to any disclaimer, the term of this patent is extended or adjusted under 35 U.S.C. 154(b) by 0 days.

(21) Appl. No.: 15/736,497

(22) PCT Filed: Jun. 14, 2016

(86) PCT No.: PCT/ES2016/070447
§ 371 (c)(1),
(2) Date: Dec. 14, 2017

(87) PCT Pub. No.: WO2016/203081
PCT Pub. Date: Dec. 22, 2016

(65) Prior Publication Data
US 2018/0191964 A1 Jul. 5, 2018

(30) Foreign Application Priority Data
Jun. 15, 2015 (EP) ..................................... 15382315

(51) Int. Cl.
*H04N 5/265* (2006.01)
*H04N 5/262* (2006.01)
(Continued)

(52) U.S. Cl.
CPC ......... *H04N 5/265* (2013.01); *G06K 9/00208* (2013.01); *H04N 5/2624* (2013.01); *H04N 13/275* (2018.05); *H04N 13/388* (2018.05)

(58) Field of Classification Search
CPC ...... H04N 5/272; H04N 5/265; H04N 13/275; H04N 13/388; G06K 9/00208
See application file for complete search history.

(56) References Cited

U.S. PATENT DOCUMENTS

| | | | |
|---|---|---|---|
| 6,985,638 B1 * | 1/2006 | Aoki | G06T 3/0068 345/645 |
| 8,400,496 B2 * | 3/2013 | Robinson | G09G 3/003 348/50 |

(Continued)

FOREIGN PATENT DOCUMENTS

| | | | | |
|---|---|---|---|---|
| EP | 2 037 671 A1 | 3/2009 | | |
| EP | 2037671 A1 * | 3/2009 | ............. | H04N 5/272 |
| WO | WO-2004010341 A1 * | 1/2004 | ............. | G06F 16/51 |

OTHER PUBLICATIONS

Richard Szeliski, "Image Alignment and Stitching: A Tutorial[1]," Internet Citation, XP-002680820, Dec. 10, 2006, pp. 1-87.

(Continued)

*Primary Examiner* — Dramos Kalapodas
(74) *Attorney, Agent, or Firm* — Sughrue Mion, PLLC

(57) ABSTRACT

Method for composing an output video signal ($S_o$) from input video signals (Si1, Si2, Si3 . . . Sim), which include input frame sequences ($S_{i1}[n]$, $S_{i2}[n]$, $S_{i2}[n]$ . . . $S_{im}[n]$) with a number of pixels for each input frame associated with an input resolution ($R_{i1}$, $R_{i2}$, $R_{i3}$ . . . $R_{im}$). The method includes determining a spatial surface on a three-dimensional virtual space associated with each pixel; establishing a visualization point (X0,Y0,Z0) and a visualization window in the three-dimensional virtual space; calculating an associated threshold pixel density for the pixels in the visualization window;

(Continued)

determining combinations of input frames with overlapping projections; and selecting the frame of each combination of frames has a pixel density in the entire overlapping part greater than or equal to the threshold pixel density or, in the absence thereof, selecting the frame which has a greater pixel density in order to form the output frame part which is overlapping.

20 Claims, 10 Drawing Sheets

(51) Int. Cl.
      *H04N 13/275*     (2018.01)
      *H04N 13/388*     (2018.01)
      *G06K 9/00*     (2006.01)

(56) References Cited

U.S. PATENT DOCUMENTS

| | | | | |
|---|---|---|---|---|
| 2003/0206179 A1* | 11/2003 | Deering | ............... | G06T 3/0081 345/589 |
| 2004/0080938 A1* | 4/2004 | Holman | ................... | F21S 8/08 362/231 |
| 2004/0227703 A1* | 11/2004 | Lamvik | .............. | G02B 27/0172 345/76 |
| 2007/0076099 A1* | 4/2007 | Eshed | ................ | H04N 5/23232 348/218.1 |
| 2007/0122786 A1* | 5/2007 | Relan | ..................... | G09B 19/00 434/308 |
| 2008/0298639 A1* | 12/2008 | Tsunekawa | ........... | G06T 3/4007 382/107 |
| 2016/0240013 A1* | 8/2016 | Spitzer | ................... | G06F 3/013 |
| 2016/0358312 A1* | 12/2016 | Kolb, V | ................. | G06T 5/003 |

OTHER PUBLICATIONS

European Search Report for EP 15382315, dated Aug. 26, 2015.
International Search Report for PCT/ES2016/070447, dated Sep. 21, 2016.
Written Opinion of the International Searching Authority for PCT/ES2016/070447, dated Sep. 21, 2016.

* cited by examiner

METHOD, DEVICE AND INSTALLATION FOR COMPOSING A VIDEO SIGNAL

CROSS REFERENCE TO RELATED APPLICATIONS

This application is a National Stage of International Application No. PCT/ES2016/070447 filed Jun. 14, 2016, claiming priority based on European Patent Application No. 15382315.8, filed Jun. 15, 2015, the contents of all of which are incorporated herein by reference in their entirety.

TECHNICAL FILED OF THE INVENTION

The present invention relates to a method, a device and an installation for composing an output video signal from a plurality of input video signals.

BACKGROUND OF THE INVENTION

Methods for composing output video signals from a plurality of input video signals are known, for example a plurality of input video signal which originate from different video cameras and which visualize part of a scene. In these methods, the frames of each input video signal are arranged in a virtual space, in the manner of a canvas by means of the technique known as video stitching, such that users can visualize said canvas by way of a visualization window. The content visualized through the visualization window is conveniently encoded to form the output signal at the predetermined resolution.

However, in the known methods, such as that described in the patent document, US2007/0076099A1, the output signal is obtained by encoding all the frames of each input video signal, it being necessary to decode and re-encode all the input video signals, for which a high processing capacity may be necessary to decode and re-encode high resolution input signals to avoid delays in the output signal.

It is thus an object of the present invention to make known a method, device and installation which allows video signals to be generated in real time from a plurality of input video signals and which allows high resolution input signals to be used without necessarily involving delays accumulating or requiring a high computational capacity.

DESCRIPTION OF THE INVENTION

The method for composing an output video signal of the present invention, is one of those which, from a plurality of input video signals, which comprise respective input frame sequences with a number of pixels for each input frame associated with an input resolution, allows an output video signal to be composed, the output video signal comprising an output frame sequence with a pre-established number of pixels for each output frame associated with an output resolution. The method advantageously, from different video signals, which, for example, represent different parts of a scene, allows an output video signal to be formed with a pre-established number of pixels for each frame from parts of the frames of input signals, with the highest quality possible. In this way, starting from input video signals with different resolutions, one obtains an output video signal at a pre-established resolution with the best quality.

The method comprises determining a spatial surface on a three-dimensional virtual space formed by a set of points with three-dimensional coordinates associated with each pixel of each frame of each input frame sequence, to establish a visualization point and visualization window also known as "viewport" in the three-dimensional virtual space, which determine a visualization cone, also known as a "frustum", in the three-dimensional virtual space, forming output frames from the projections of the frames of the input sequences projected in said visualization window; to calculate an associated threshold pixel density for the pixels in the visualization window, from the output resolution and the associated spatial dimensions of said visualization window; to determine combinations of input frames, the projections of which are at least partially overlapping in the visualization window and for each combination of frames, to select the frame of each combination of frames which projected on the visualization window has a pixel density in the entire overlapping part greater than or equal to the threshold pixel density or in the absence thereof, to select the frame which projected on the visualization window has a greater pixel density in order to form the output frame part which is overlapping. In this way, the content of the higher resolution input signals, which are not going to be used for codifying the output signal, advantageously does not have to be processed since a lower resolution input signal already exists which can be used to codify the output signal at the required output resolution without losing quality.

In one embodiment variant, the steps of determining a spatial surface over a three-dimensional virtual space and/or establishing in the three-dimensional virtual space a visualization point and a visualization window, are carried out during the prior configuration step, by a configuration operator, such that an operator need only move the visualization window(s) in the manner of a camera or virtual camera in order to compose the output video signal, or output video signals, if there is a plurality of visualization windows, in the manner of virtual cameras. Naturally, it is also envisaged that the positions of the frame sequences may be adjusted further along, for example, if they have not been duly arranged, or if, for example, one of the cameras providing the input video signal is moved slightly, for example, because it is hit. It is also envisaged that during the visualization new visualization points may be added along with their associated visualization windows, for example, to incorporate additional virtual cameras.

In a variant of interest, the spatial surface is three dimensional, said surface being arranged in the manner of a canvas in the three-dimensional virtual space on which the frames will be arranged from the input video sequences, such that the frames are arranged so as to make up a three-dimensional shape as established by the configuration operator, such that said frames may be arranged retracing a suitable three-dimensional shape, for example the walls of a house or even a three-dimensional model previously captured in a known manner, for example by means of a three-dimensional scanner device. Although generally the spatial surface will extend into the three dimensions of the virtual space, it is also envisaged that said surface may only extend into two dimensions, i.e. it may be a plane, such that when upon said plane frames from different sequences of frames are arranged, for example frames from sequences of frames with different resolutions, or which take up different portions of the surface, or overlap, the frames may be chosen which make it possible to generate the output video signal having the best resolution based on the arrangement of the visualization window(s), by means of the method of the present invention.

In another embodiment variant, if in some of the combinations of frames there exists a plurality of frames which projected on the visualization window have a pixel density in the entire overlapping part greater than or equal to the threshold pixel density, the frame which projected on the visualization window has a pixel density closest to the threshold pixel density is selected from among this plurality of frames. In this way, if there were a plurality of frames which provide a sufficient resolution, only those directly greater than the threshold pixel density are taken, which is what can be processed more easily.

It is envisaged that the visualization point and the size of the visualization window and therefore the visualization cone can be modified by means of controls, for example PTZ controls received from a user in a known manner, or the visualization cone can be moved through the three-dimensional virtual space by way of a tracking shot, or any other movement that would involve changing the visualization point in any of the three dimensions, and which would be analogous to that which could be done by means of a real physical camera, such that the visualization window can be displaced and other regions of the three-dimensional space can be projected therein, thus acting as a virtual visualization camera of the three-dimensional virtual space. Naturally, when the visualization point of the three-dimensional space, the window size or the visualization cone change, it may be necessary to have to re-select the frames of the combinations of frames so that the output signal thus has the suitable resolution. It will therefore be advisable to redo the calculations in order to ensure that the output video signal is being composed from the most suitable input video signals. It is also envisaged that there can be more than one virtual visualization camera of the three-dimensional virtual space, for example if more than one user must visualize the three-dimensional virtual space. In this case, the method for composing the output video signal must be carried out for the output signal which is sent to each user.

According to another embodiment variant, in order to form the part of the output frame which is overlapping, a mixture is made between the frame selected from each combination of frames and at least another frame of the same combination of frames, for example when two or more input frames project in the output window which are only partially overlapping such that a transition is achieved, for example in the form of a progressive gradient or binary mask between the different input frames which form the output frame. This transition can only be carried out at the ends of the part which is overlapping.

According to another embodiment variant in order to form the output frame part which is overlapping, only the frame selected from each combination of frames is used, for example when the frame selected from each combination of frames covers the entire visualization window and therefore it is not necessary to carry out a transition.

According to another embodiment variant, the pixel density of each frame projected on the visualization window is calculated from the projection of groupings of pixels of the frame, preferably the groupings of pixels can be triangular divisions of each frame.

According to another embodiment variant, the step of selecting the frame of each frame combination is carried out, progressively evaluating the frames, starting first with the lower resolution input frame and ending with the higher resolution input frame, such that first the lower resolution frames have to be processed which can be processed more quickly.

According to another embodiment variant, the spatial surfaces associated with each pixel of each frame of each input frame sequence in the virtual three-dimensional space form the interior of a sphere, such that the frames are equidistant from the visualization point.

According to another embodiment variant, at least one of the input video signals is a video signal generated by a video camera from a scene such that the output signal incorporates frames taken in real time.

According to another embodiment variant, at least two video signals are adapted to form frame sequences with at least part of the same content at different resolutions such that if one video signal represents a general view of a scene and another video signal a detail of said scene in higher resolution, when it is desired that the output signal has a resolution similar to that of the general view of the scene, for example when the visualization window is narrow, it is not necessary to process the other video signal with the detail. Similarly, when it is desired to only visualize the detail of said scene, expanding it, with which the visualization window is wider, it is necessary to use the other video signal with the detail to form the output signal.

According to another embodiment variant, at least two of the video signals determine frame sequences with the same content at different resolutions such that one video signal can completely substitute the other to form the output signal.

According to a variant of interest, at least two video signals originate from a same video camera such that the outputs can be used at a different resolution to a camera as input signals.

According to an embodiment variant, at least one of the video signals is adapted to form frames, the content of which is a virtual representation of at least part of the content of the frame of another of the video signals, such that this virtual representation can be generated from a data set, vectorial elements or a three-dimensional model such that the resolution of said virtual representation can be as high as desired. In this way, if it is known that part of the content of a frame of a video signal which originates from the capture of a video camera has a determined image and this part can be modeled, this modeled part can be provided in a form of another video signal, such that it is provided and to substitute the part of the frame with the same content when the output resolution cannot be provided. For example, the virtual representation can be the content of a screen which is visualized in a general manner in another frame of another input signal, such that if it is necessary the content of the screen in the general visualization can be replaced by the virtual representation.

The method of the present invention can be encoded in a computer program, said computer program being adapted for realizing the method when it is executed in a computer.

A device for processing data is also made known which comprises means for realizing the method of the invention, being able to form said device of an installation which also comprises at least one video camera, such that the output of the video camera represents one of the input signals of the device.

BRIEF DESCRIPTION OF THE DRAWINGS

In order to complement the description and with the aim of facilitating the understanding of the characteristics of the invention, the present specification is accompanied by a set of drawings in which the following is depicted in an illustrative and non-limiting manner.

DETAILED DESCRIPTION OF THE DRAWINGS

Figure 1:
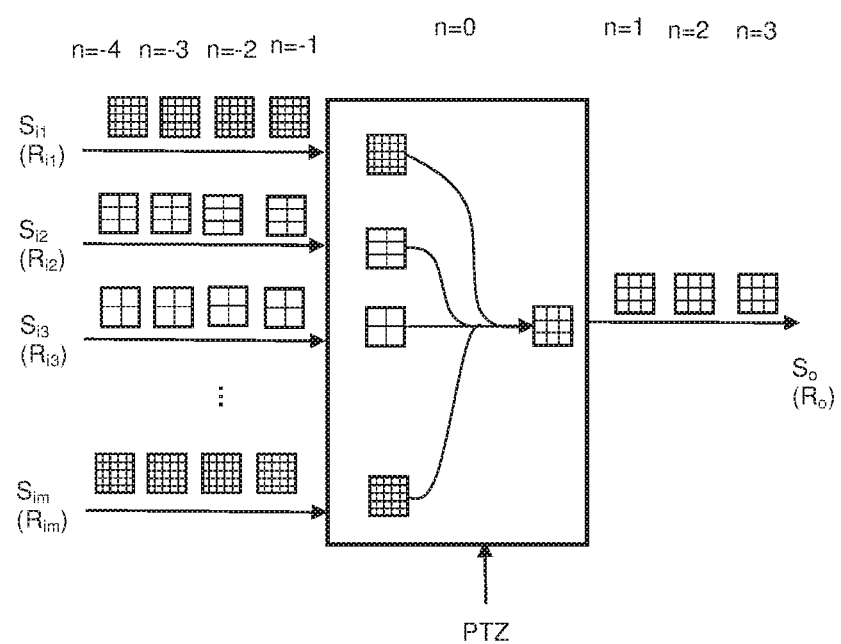
FIG. 1 depicts a function diagram of a system which implements the method of the present invention.

FIG. 1 shows a function diagram of a system which implements the method of the present invention, which, from a plurality of input video signals $S_{i1}, S_{i2}, S_{i3} \ldots S_{im}$, which comprise respective input frame sequences $S_{i1}[n]$, $S_{i2}[n], S_{i3}[n] \ldots S_{im}[n]$ in different temporal spaces with a number of pixels for each input frame associated with an input resolution $R_{i1}, R_{i2}, R_{i3} \ldots R_{im}$, allows an output video signal $S_o$ to be composed, which comprises an output frame sequence $S_o[n]$ with a pre-established number of pixels for each output frame associated with an output resolution $R_o$. The input resolutions $R_{i1}, R_{i2}, R_{i3} \ldots R_{im}$ can be different to the output resolution $R_o$.

In the scope of the invention, the term resolution is considered the maximum number of pixels, normally indicated as vertical pixels and horizontal pixels which can be obtained from a frame of the frame sequences of a video signal.

As a function of the number of pixels of a frame per unit of length when the latter is for example depicted on a screen, another parameter can be determined, the pixel density. Usually, the units which are used for designating the pixel density are pixels per inch (ppi), although any other measurement of the real or virtual length can be used. The pixel density is thus inversely proportional to the pixel size, which would be the units of length which occupy said pixel. Naturally this pixel density and pixel size can be calculated when the frame is depicted in a three-dimensional virtual space as will be seen further on.

In the depicted example, a plurality of input video signals $S_{i1}, S_{i2}, S_{i3}, \ldots S_{im}$ is indicated which comprise respective input frame sequences $S_{i1}[n], S_{i2}[n], S_{i3}[n] \ldots S_{im}[n]$ with a number of pixels for each frame. Naturally, it is considered that any other number of input video signals can be used and have various resolutions.

By means of the method of the present invention, which is implemented by the system shown in FIG. 1, proceeding from input video signals $S_{i1}, S_{i2}, S_{i3}, \ldots S_{im}$, which comprises respective input frame sequences $S_{i1}[n], S_{i2}[n]$, $S_{i3}[n] \ldots S_{im}[n]$ with different resolutions, codifying an output video signal $S_o$ is achieved, the frames of which comprise a number of predetermined vertical and horizontal pixels which determine an output resolution $R_o$. This output resolution $R_o$ can be predetermined by an operator or can be selected during the functioning of the system. Examples of the possible resolutions, both input $R_{i1}, R_{i2}, R_{i3} \ldots R_{im}$ and output $R_o$ are those known in the prior art, usually prepared for the display thereof on screens of the same resolution, both those considered as high and low definition, such as 480i (243×243 pixels), 576i (288×288 pixels), 480p (720× 480 pixels), 576p (720×576), 720p (1,280×720 pixels), 1080i o 1080p (1,920×1,080 pixels), 2160p (3,840×2,160 pixels) -4K UHD-, 4320p (7,680×4,320 pixels) -8K UHD- as well as any other resolution.

Figure 2:
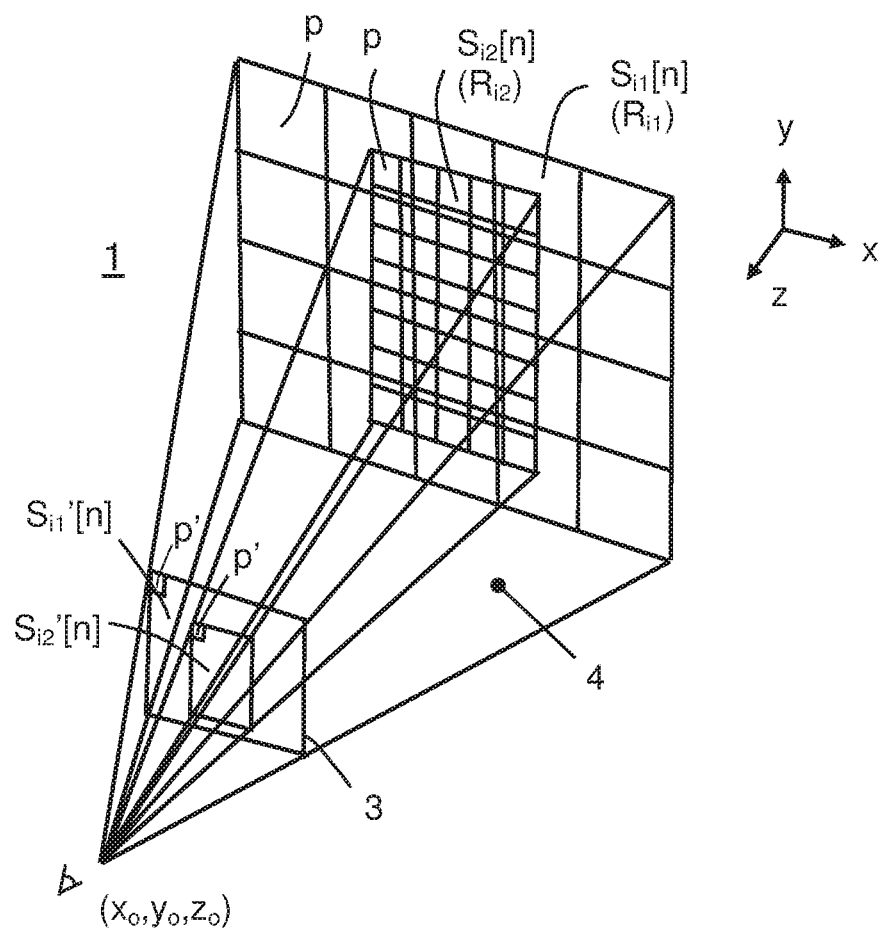
FIG. 2 depicts a three-dimensional virtual space following the configuration phase with a visualization window.

As can be observed in FIG. 2, during a configuration step, a spatial surface on a three-dimensional virtual space 1 is determined formed by a set of points with three-dimensional coordinates X, Y, Z associated with each pixel of each frame of each input frame sequence. By way of example, the spatial surface, which the frames of the input frame sequences shown occupy, are arranged on a plane to facilitate the description of the invention. Naturally, they can also be arranged following other geometric shapes as will be seen further on. This shape can for example follow the interior of a sphere, the visualization point being arranged in the center of the sphere, or the shape can be given by a virtualized model of an area such as a room, such that if the different input video signals originate from parts of said room, the frames can be arranged on the parts of said virtualized room, such that an operator can move in the form of a virtual camera through the virtualized room, conveniently adjusting the visualization angle of each one of the frame sequences which originate from the cameras which have been previously arranged on the three-dimensional model in the configuration step. Naturally, it is also envisaged that the position of the frame sequences can be adjusted, for example if during the configuration step they have not been duly arranged or if, for example, one of the cameras providing the input video signal is moved slightly, for example because it is hit. It is also envisaged that during the visualization new visualization points may be added along with their associated visualization windows, for example, to incorporate additional virtual cameras.

It is also envisaged that the method may be used for surveillance functions at large sites where it is necessary to arrange various cameras that will provide input video signals from different portions of the site, at different resolutions, and which may overlap, such that the frames of the input video signals may be arranged over the parts of said virtualized site, for example, a football stadium or an airport. It is envisaged that the most critical portions of the sites will be shot by cameras allowing for high-resolution input video signals, such that an operator can visualize these critical portions using the higher-resolution video signal in the way detailed in the present invention, in order to generate the output signal, when this is suitable.

Naturally, it is also envisaged that the different input video signals and their arrangement in the three-dimensional virtual space may be stored, so that later on the different input video signals and their arrangement in the three-dimensional space may be played back, for example in order to visualize the three-dimensional space from another visualization point or with another degree of detail.

In order to visualize the three-dimensional virtual space, a visualization point (X0, Y0, Z0) and a visualization window 3, also known as "viewport", is established in the three-dimensional virtual space, determining a visualization cone 4 in the three-dimensional virtual space, known as a frustum, as shown in FIG. 2. In this way, the output frames are formed from the projections of the frames of the input sequences projected in said visualization window 3 at the same temporal instant, conveniently encoded. In case the number of frames per second of the input signals projected in the visualization window 3 are different to the number of frames per second of the output signal, some input frames must be discarded if these are quicker than the number of frames per second of the output signal or even maintain the input frames for more than one instant if they are quicker than the number of frames per second of the output signal in a known manner.

Advantageously the method allows only the input signals, which provide frames, the projections of which $S_1'[n]$, $S_2'[n]$ are visible in the projection window, to have to be decoded in order to form the output video signal. In addition, if there are combinations of input frames, the projections of which remain at least partially overlapping in the visualization window 3, it is possible that all the input signals of the overlapping frames do not have to be processed, that is to say, decoded, in order to re-encode the input signal.

Figure 3:
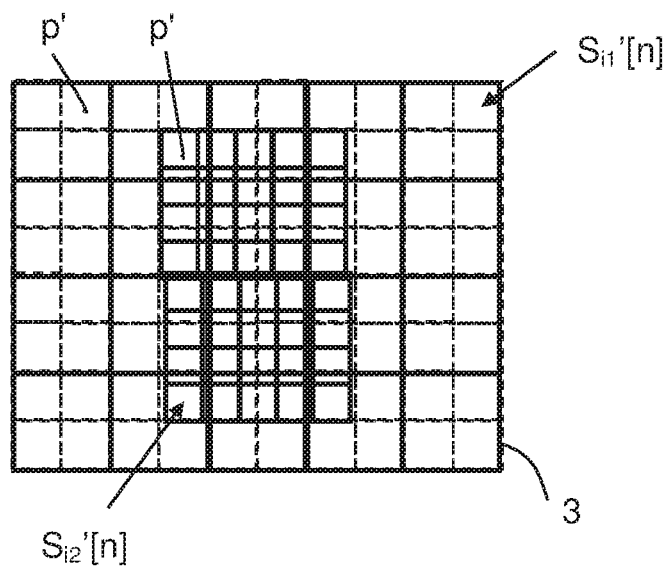
FIG. 3 depicts the content of the visualization window of FIG. 2.

When there are combinations of input frames, for example the visualization window 3 shown in FIG. 3, an associated threshold pixel density $d(S_o[n])$ must firstly be calculated for the pixels in the visualization window 3, from the output resolution $R_o$ and the associated spatial dimensions of said visualization window 3. This threshold pixel density is in FIGS. 3, 4a and 4b the relation between the number of pixels which is given by the output resolution and the surface of the visualization window 3, that is to say, dividing the total number of pixels equivalent to the output resolution, between the surface which occupies the visualization window 3 in the three-dimensional virtual space. In this way, a threshold pixel density $d(S_o[n])$ is obtained, from which, if only a pixel density greater than the projections can be obtained, the pixels need to be interpolated, with which the output signal is degraded. Therefore it is very important that the pixel density of the projected frame $S_1'[n]$, $S_2'[n]$, which is always used, is that which allows the desired output resolution to be obtained. Naturally, in other embodiment variants this projected frame, which is always used, can be combined with the rest of the frames in the overlap area, for example $S_1'[n]$, $S_2'[n]$ to make a progressive transition between frames of different resolutions in the area which is overlapped in the visualization window 3 or at the ends of the overlap area to avoid the user being able to observe abrupt transitions, although in this way, part of the quality of the output frame in this area must be sacrificed since it is envisaged that the users better tolerate a loss of quality for realizing a progressive transition than a break in quality which may be abrupt.

It is not convenient for this area of the visualization window 3 in which there are combinations of input frames to always take the higher resolution frame, since although it is ensured that the quality of the frames of the input signal is always the best that can be obtained, it brings with it a processing cost which may not be necessary if there is another input signal, the pixel density of the projected frame of which is more suitable.

Therefore, it is firstly necessary to determine the combinations of input frames the projections of which are at least partially overlapping in the visualization window 3, as shown in FIG. 3 for each combination of frames, select the frame of each combination of frames which projected on the visualization window 3 has a pixel density $d(S_{i1}'[n])$, $d(S_2'[n])$ expressed in pixels per unit squared of the three-dimensional virtual space 1 in the entire overlapping part greater than or equal to the threshold pixel density $d(S_o'[n])$ or in the absence thereof, select the frame which projected on the visualization window 3 has a greater pixel density in order to form the part of the output frame which is overlapping.

Figure 4A:
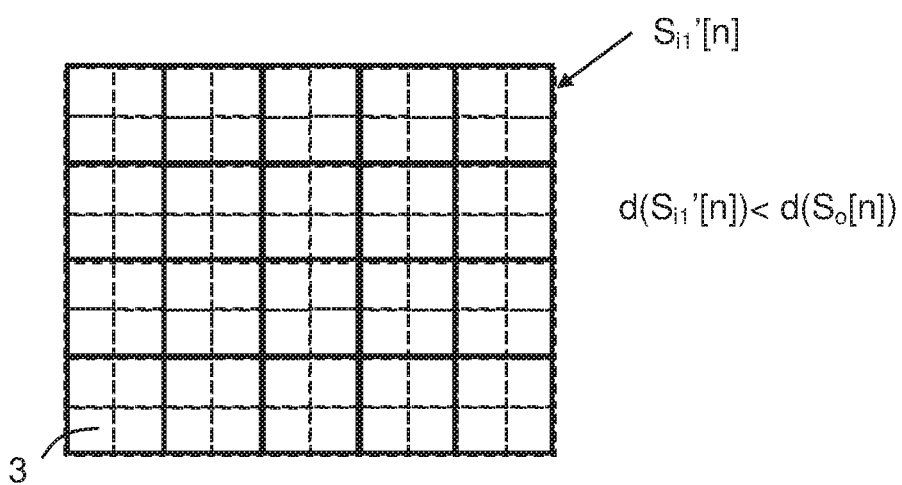
FIGS. 4a and 4b depict the comparison between the threshold pixel density and the pixel density of each frame in the visualization window of FIG. 3.
Figure 4B:
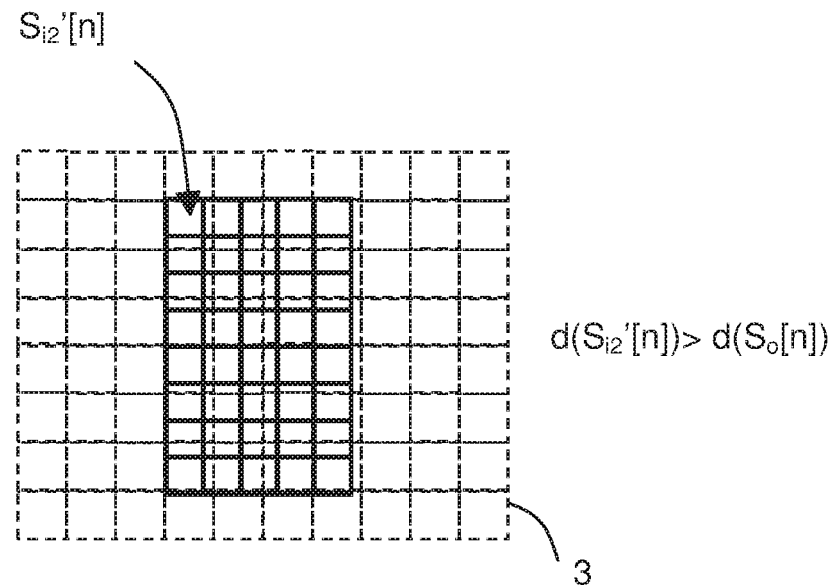

From the overlapping frame in FIG. 3, the FIGS. 4a and 4b show the comparison between the threshold pixel density $d(S_o'[n])$ and the pixel densities of the projections of each one of the frames $d(S_{i1}'[n])$, $d(S_2'[n])$, being determined such that for each visualization window 3, the pixel density provided by the projection of the frame of the first signal $d(S_{i1}'[n])$ is less than the threshold pixel density $d(S_o'[n])$ as can be observed visually in FIG. 4a and the pixel density provided by the projection of the frame of the second signal $d(S_{i2}'[n])$ is greater than the threshold pixel density $d(S_o'[n])$ as can be observed visually in FIG. 4b.

Figure 5:
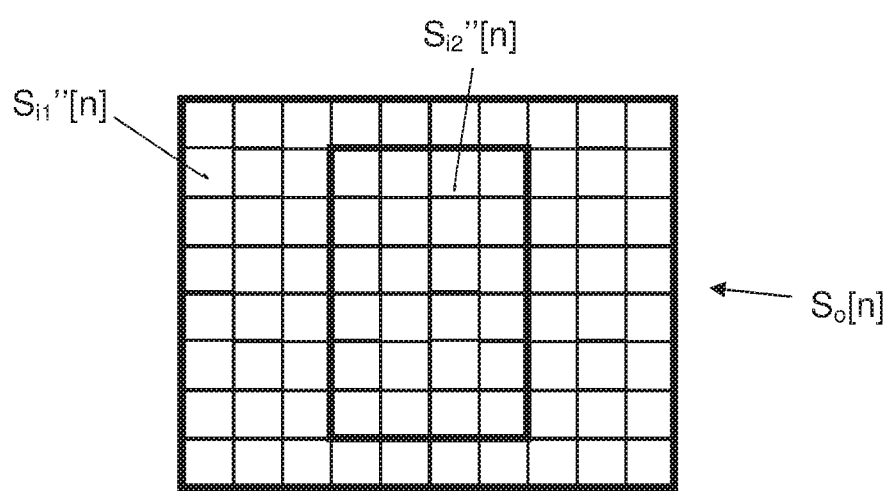
FIG. 5 depicts the composition of the output frame formed from the content of the visualization window of FIG. 3.

Therefore it would be more convenient to use the projection of the frame of the second input signal $S_{i2}'[n]$ to form the portion in which the projections are partially overlapping $S_{i2}''[n]$ in the output frame $S_o[n]$, since the pixel density of the second projected signal is the only one greater than the threshold of those available, while for the rest of the visualization window 3, when only information of the first input signal $S_{i1}$ is available, the pixels of the corresponding frame of the output frame sequence must be formed from the first input signal $S_{i1}$, $S_{i1}''[n]$ as is indicated in FIG. 5

Figure 6:
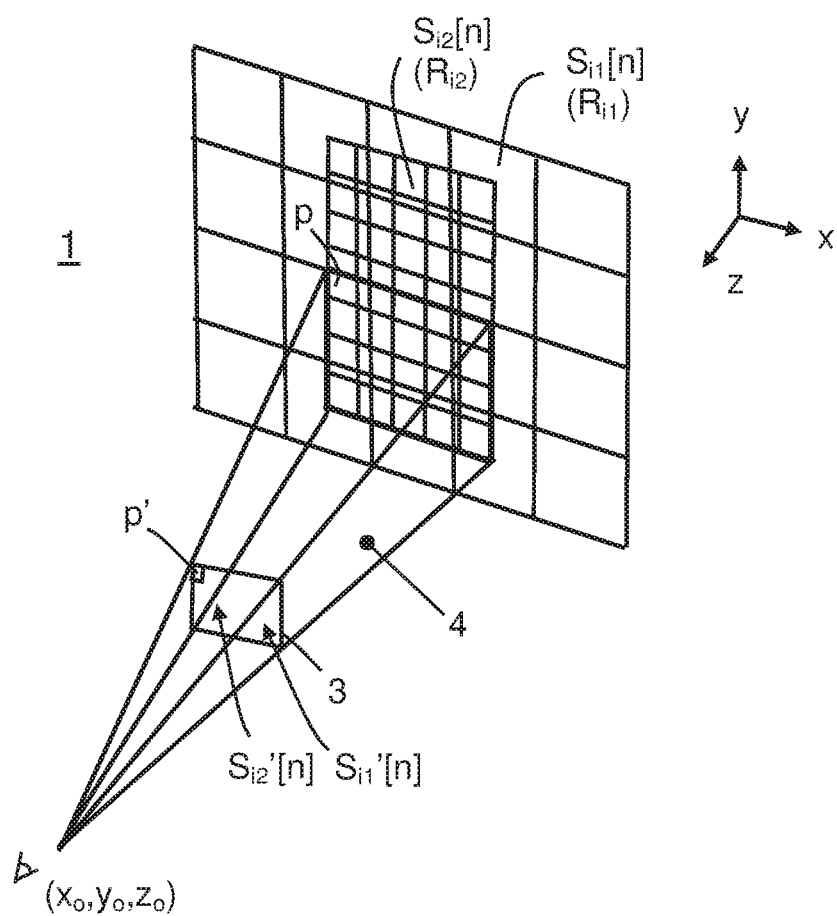
FIG. 6 depicts the visualization by means of another visualization window of the three-dimensional virtual space of FIG. 2.
Figure 7:
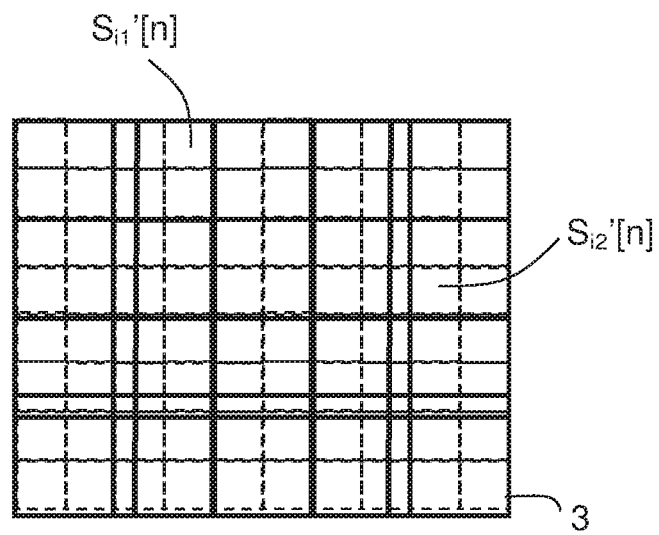
FIG. 7 depicts the content of the visualization window of FIG. 6.
Figure 8A:
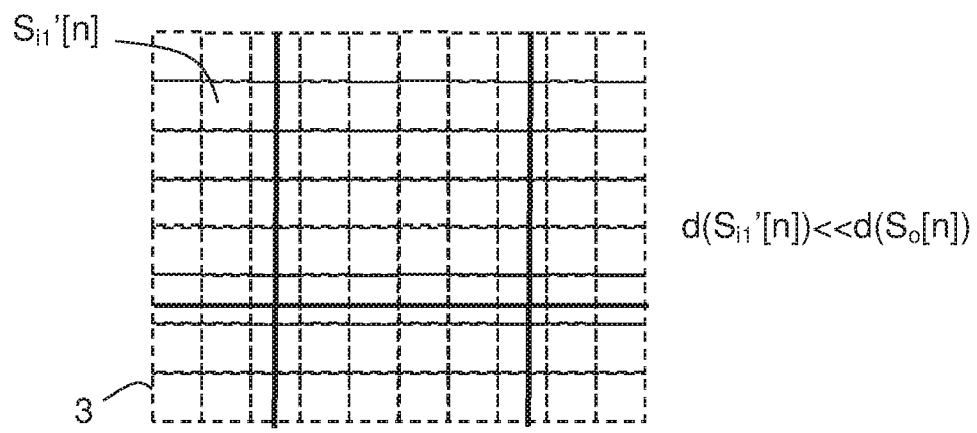
FIGS. 8a and 8b depict the comparison between the threshold pixel density and the pixel density of each frame in the visualization window of FIG. 7.
Figure 8B:
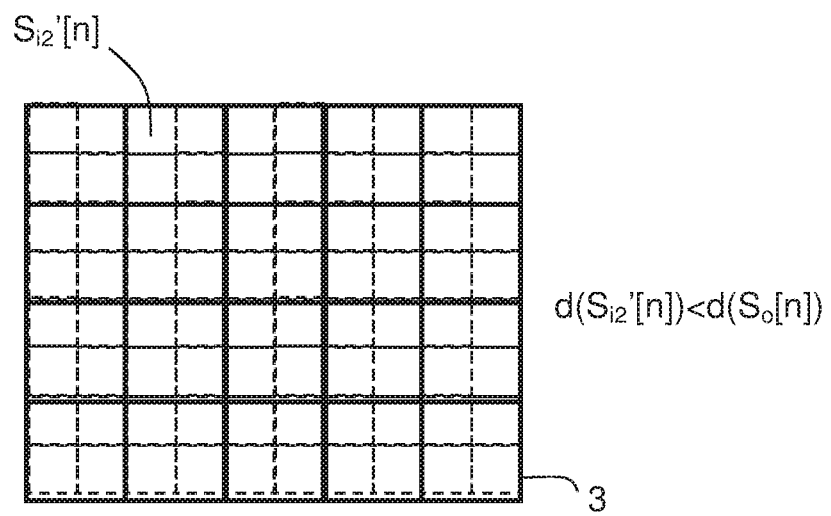
Figure 9:
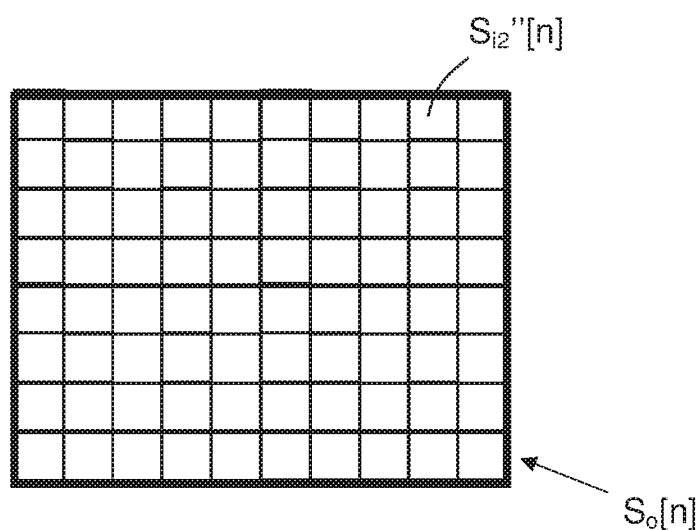
FIG. 9 depicts the composition of the output frame formed from the content of the visualization window of FIG. 7.

FIG. 6 shows another visualization of the same three-dimensional virtual space in which from the projection in the visualization window 3 shown in FIG. 7, it follows that the pixels density of none of the input signals compared separately in FIGS. 8a and 8b is greater than or equal to the threshold pixel density $d(S_o'[n])$ since as shown in FIG. 8a, the pixel density provided by the projection of the frame of the first signal $d(S_{i1}'[n])$, still less than the threshold pixel density $d(S_o'[n])$ and as FIG. 8b shows, the pixel density provided by the projection of the frame of the second signal $d(S_{i2}'[n])$ is also less than the threshold pixel density $d(S_o'[n])$.

Therefore, in this case, for the combination of frames, the frame from among the combination of frames projected with greater pixel density is selected, in this case that of the second input signal $S_{i2}''$.

Figure 10:
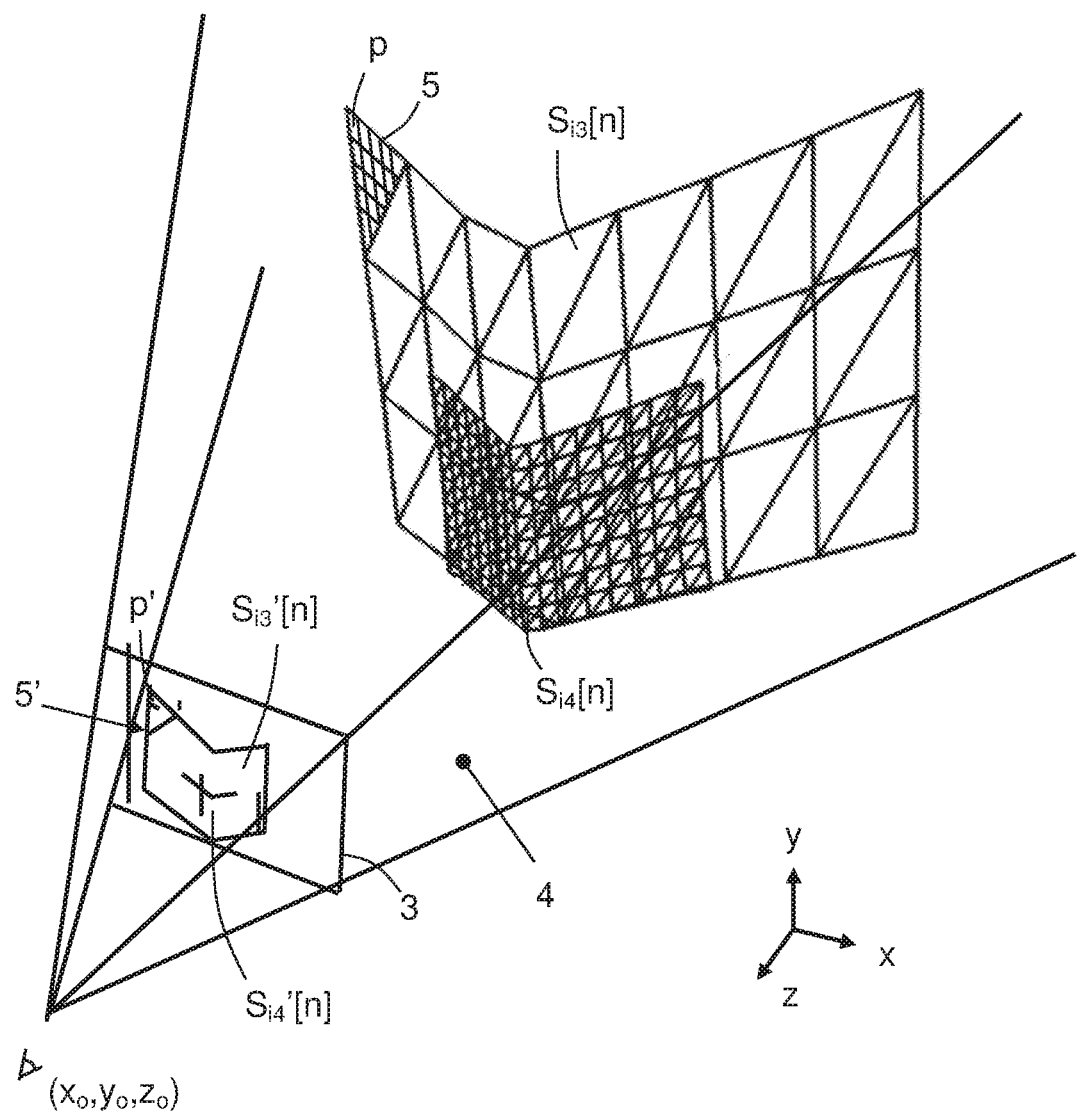
FIG. 10 depicts another three-dimensional virtual space following the configuration phase with a visualization window.
Figure 11:
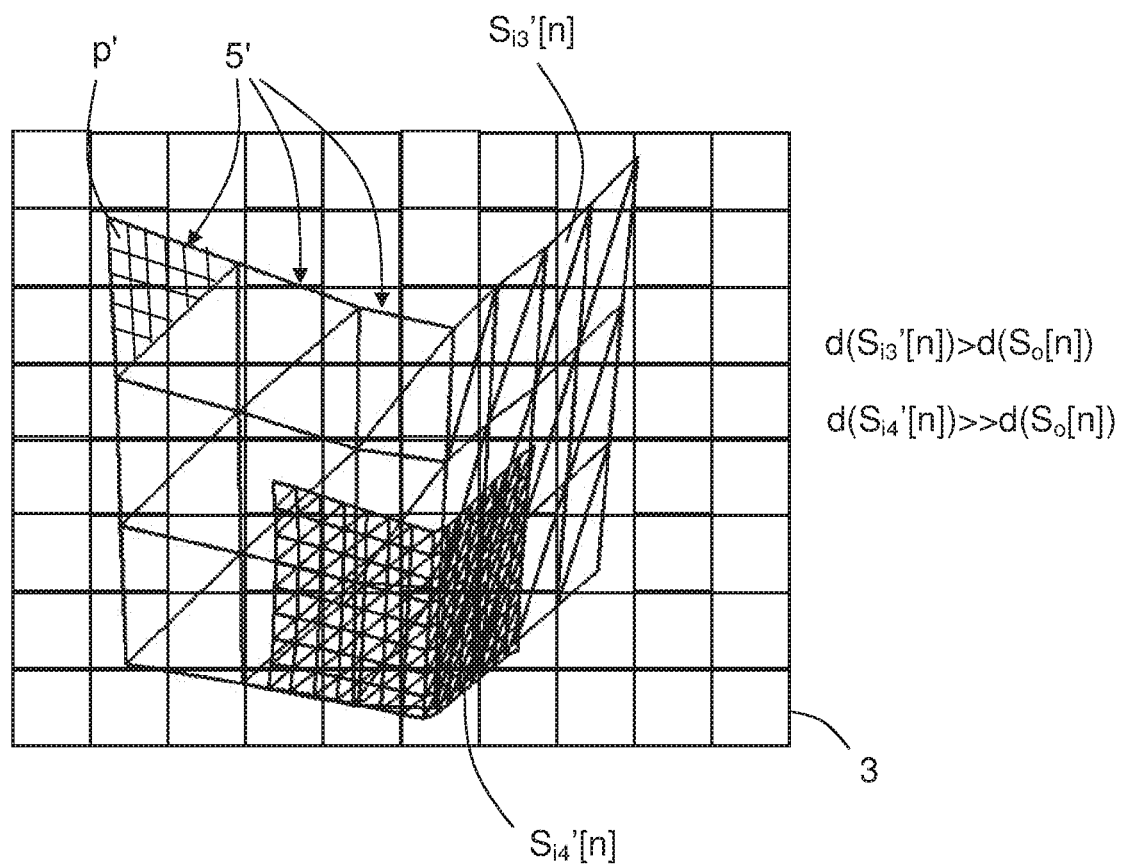
FIG. 11 depicts the content of the visualization window of FIG. 10.

The pixel density of each frame projected on the visualization window 3 can be calculated both pixel to pixel as well as from the projection of grouping of pixels 4 of the frame. Naturally, when pixel to pixel density is calculated, the computational cost is greater, however, the point at which a frame with greater or less pixel density must be used is better determined. It has been observed that using groupings of pixels 5 in the form of triangular divisions, a good estimate of the pixel density is achieved, for example as is shown in the virtual space of FIG. 10 with frames of a third and fourth input signal $S_{i3}$, $S_{i4}$ in which the content projected in the visualization window 3 is shown in FIG. 11. Naturally, for this three-dimensional virtual space 1 the perspective, which the projection of groupings 5' of pixels has, must be taken into account. It can be observed in an example shown in FIG. 10, the output resolution $R_o$ shown in the visualization window 3 in FIG. 11 is low, resulting in the threshold pixel density being equally low which is lower than those of the projections $S_{i3}'[n]$ and $S_{i4}'[n]$ therefore when progressively evaluating the frames, starting first with the lower resolution input frame and ending with the higher resolution input frame, it is determined that the frame of the combination of frames $S_{i3}, S_{i4}$ the frame $S_{i3}$ projected on the visualization window 3 has a pixel density $d(S_{i3}'[n])$ on the entire overlapping part greater than or equal to the threshold pixel density $d(S_o[n])$. When the pixel density $d(S_{i4}'[n])$ of the other frame is greater still, only the frame is taken, which projected on the visualization window has a pixel density closer to the threshold pixel density, that is to say, $S_{i3}'[n]$).

Figure 12:
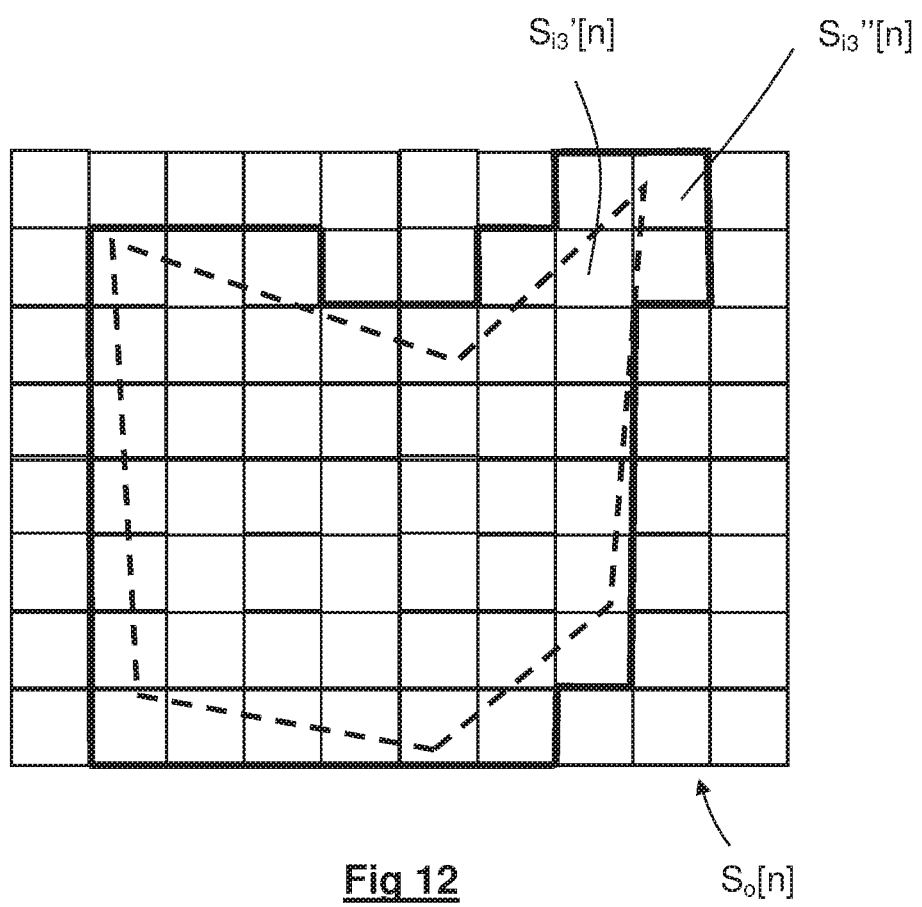
FIG. 12 depicts the composition of the output frame formed from the content of the visualization window of FIG. 11.

Therefore, the pixels of the frame of the output signal $S_o[n]$ are only formed from the projection of frames $S_{i3}'[n]$ re-encoded at the output resolution $R_o$, $S_{i3}''[n]$, as shown in FIG. 12.

Advantageously, the method of the present invention can be used to combine input video signals generated by one or various video cameras, in which at least part of the same content is depicted, for example a part of a scene, at different resolutions and which are combined forming a composite video, also known as video stitching in the three-dimensional virtual space. It is also possible for video signals to depict the same content at different resolutions and which during the configuration step are arranged overlapping in the three-dimensional virtual space.

It is also considered that at least one of the video signals can be adapted to form frames, the content of which is a synthesis image, that is to say, formed by a computer from vectors, data or from a three-dimensional model such that its pixel density is infinite in practice.

The invention claimed is:

1. A method comprising:
composing an output video signal, which comprises an output frame sequence with a pre-established number of pixels for each output frame associated with an output resolution from a plurality of input video signals comprising respective input frame sequences with a number of pixels for each input frame associated with an input resolution, the composing of the output video signal comprising:
determining, by a computer, a spatial surface on a three-dimensional virtual space, formed by a set of points with three-dimensional coordinates associated with each pixel (p) of each frame of each input frame sequence;
establishing, by the computer, in the three-dimensional virtual space a visualization point and a visualization window,
determining, by the computer, a visualization cone in the three-dimensional virtual space based on the visualization point and the visualization window,
forming, by the computer, output frames from projections of the input frames of the input sequences projected in the visualization window;
calculating, by the computer, an associated threshold pixel density for the pixels in the visualization window from the output resolution and the associated spatial dimensions of the visualization window;
determining, by the computer, combinations of overlapping input frames, the projections of which are at least partially overlapping in the visualization window; and
for each combination of overlapping input frames:
determining, by the computer, whether any of the overlapping input frames has a pixel density in the entire overlapping part greater than or equal to a threshold pixel density;
based on determining that a frame of the overlapping input frames has the pixel density in the entire overlapping part that is greater than or equal to the threshold pixel density, selecting, by the computer, the frame of the overlapping input frames that has the pixel density in the entire overlapping part that is greater than or equal to the threshold pixel density in order to form the output frame part which is overlapping; and
based on determining that no frame of the overlapping input frames has a pixel density in the entire overlapping part that is greater than or equal to the threshold pixel density, selecting the frame of the overlapping input frames which projected on the visualization window has the pixel density closest to the threshold pixel density in order to form the output frame part which is overlapping.

2. The method according to claim 1, wherein the step of determining the spatial surface on the three-dimensional virtual space is carried out during a prior configuration step.

3. The method according to claim 1, wherein the step of establishing, in the three-dimensional virtual space, the visualization point and the visualization window is also carried out during a prior configuration step.

4. The method according to claim 1, wherein the spatial surface is three-dimensional.

5. The method according to claim 4, wherein if in any of the combinations of overlapping input frames there is a plurality of frames which projected on the visualization window have a pixel density in the entire overlapping part greater than or equal to the threshold pixel density, from this combination, the overlapping input frames are selected which projected on the visualization window have the pixel density closest to the threshold pixel density.

6. The method according to claim 1, wherein in order to form the output frame part, which is overlapping, a mixture of frames is made between the frame selected from each combination of overlapping input frames and at least another frame of the same combination of overlapping input frames.

7. The method according to claim 1, wherein in order to form the output frame part, which is overlapping, only the frame selected from each combination of overlapping input frames is used.

8. The method according to claim 1, wherein the pixel density of each frame projected on the visualization window is calculated from the projection of groupings of pixels of the frame.

9. The method according to claim 1, wherein the step of selecting the frame of each combination of overlapping input frames includes progressively evaluating the overlapping input frames, starting first with the lower resolution input frame and ending with the higher resolution input frame.

10. The method according to claim 1, wherein the spatial surfaces associated with each pixel of each frame of each input frame sequence in the three-dimensional virtual space form a surface equivalent to at least a portion of the interior of a sphere.

11. The method according to claim 1, wherein at least one of the input video signals is a video signal generated by a video camera.

12. The method according to claim 1, wherein at least two of the input video signals are adapted for forming frame sequences with at least part of the same content at different resolutions.

13. The method according to claim 12, wherein at least two of the input video signals are adapted for forming frame sequences with the same content at different resolutions.

14. The method according to claim 1, wherein at least two of the input video signals originate from a same video camera.

15. The method according to claim 1, wherein at least one of the video signals is adapted for forming frames, the content of which is a synthesis image of at least part of the content of the frame of another of the video signals.

16. A non-transitory readable-medium that stores computer program code configured for realizing the method according to claim 1.

17. A device for processing data which comprises means for carry out the method according to claim 1.

18. An installation which comprises the device according to claim 17 and at least one video camera connected to the device for providing an input video signal.

19. The method according to claim 1, wherein the threshold pixel density is obtained by dividing the total number of pixels equivalent to the output resolution, between the surface which occupies the visualization window in the three-dimensional virtual space.

20. The method according to claim 1, wherein the pixel density is determined based on the number of pixels of a frame per unit of length when the frame is depicted on a screen, when the frame is depicted in a three-dimensional virtual space.

* * * * *